(12) United States Patent
Kang et al.

(10) Patent No.: US 10,266,273 B2
(45) Date of Patent: Apr. 23, 2019

(54) AIRCRAFT ENGINE PYLON

(71) Applicant: MRA Systems, Inc., Baltimore, MD (US)

(72) Inventors: Yanxiang Kang, Shanghai (CN); Mingchao Yuan, Shanghai (CN); Xueliang Fang, Shanghai (CN)

(73) Assignee: MRA Systems, LLC, Baltimore, MD (US)

(*) Notice: Subject to any disclaimer, the term of this patent is extended or adjusted under 35 U.S.C. 154(b) by 208 days.

(21) Appl. No.: 14/907,233

(22) PCT Filed: Jul. 26, 2013

(86) PCT No.: PCT/CN2013/080165
§ 371 (c)(1),
(2) Date: Jan. 22, 2016

(87) PCT Pub. No.: WO2015/010315
PCT Pub. Date: Jan. 29, 2015

(65) Prior Publication Data
US 2016/0159487 A1    Jun. 9, 2016

(51) Int. Cl.
*B64D 27/26* (2006.01)
*B64D 27/18* (2006.01)

(52) U.S. Cl.
CPC ............. *B64D 27/26* (2013.01); *B64D 27/18* (2013.01); *B64D 2027/264* (2013.01); *B64D 2027/266* (2013.01)

(58) Field of Classification Search
CPC .. B64D 27/26; B64D 27/18; B64D 2027/266; B64D 2027/264
See application file for complete search history.

(56) References Cited

U.S. PATENT DOCUMENTS

| | | |
|---|---|---|
| 4,265,503 A | 5/1981 | Baur |
| 4,412,774 A | 11/1983 | Legrand et al. |
| 4,428,609 A | 1/1984 | Baehr |
| 4,452,266 A | 6/1984 | Ogino et al. |
| 4,489,905 A | 12/1984 | Bengelink et al. |
| 4,531,694 A | 7/1985 | Soloy |
| 4,555,078 A | 11/1985 | Grognard |

(Continued)

FOREIGN PATENT DOCUMENTS

| | | |
|---|---|---|
| CN | 101233046 A | 7/2008 |
| CN | 102026870 A | 4/2011 |

(Continued)

OTHER PUBLICATIONS

International Search Report issued in connection Application No. PCT/CN2013/080165 dated May 6, 2014.

(Continued)

*Primary Examiner* — Valentina Xavier
(74) *Attorney, Agent, or Firm* — General Electric Company; Pamela A. Kachur

(57) ABSTRACT

An aircraft engine pylon having an upper fitting, an upper panel located below the upper fitting, a shear pin at least partially coupling the upper fitting and the upper panel, and tension fasteners at least partially coupling the upper fitting and the upper panel with the shear pin defining a shear force load path and the tension fasteners defining tension force load paths.

13 Claims, 6 Drawing Sheets

(56) References Cited

U.S. PATENT DOCUMENTS

| | | |
|---|---|---|
| 4,585,189 A | 4/1986 | Buxton |
| 4,624,436 A | 11/1986 | Cooney et al. |
| 4,637,573 A | 1/1987 | Perin et al. |
| 4,717,094 A | 1/1988 | Chee |
| 4,725,019 A | 2/1988 | White |
| 4,742,975 A | 5/1988 | Pachomoff et al. |
| 4,771,968 A | 9/1988 | Perry |
| 4,790,137 A | 12/1988 | Quinn |
| 4,821,980 A | 4/1989 | Clausen et al. |
| D302,982 S | 8/1989 | Bainbridge |
| 4,940,196 A | 7/1990 | Lardellier |
| 4,966,338 A | 10/1990 | Gordon |
| 4,991,431 A | 2/1991 | Gaither |
| 5,061,217 A | 10/1991 | Miller et al. |
| 5,065,959 A | 11/1991 | Bhatia et al. |
| 5,102,069 A | 4/1992 | Hackett et al. |
| 5,127,606 A | 7/1992 | Chan et al. |
| 5,156,353 A | 10/1992 | Gliebe et al. |
| 5,181,675 A | 1/1993 | Lardellier et al. |
| 5,222,692 A | 6/1993 | Glowacki |
| 5,275,357 A | 1/1994 | Seelen et al. |
| 5,277,382 A | 1/1994 | Seelen et al. |
| 5,303,880 A | 4/1994 | Cencula et al. |
| 5,303,896 A | 4/1994 | Sterka |
| 5,320,307 A | 6/1994 | Spofford et al. |
| 5,381,654 A | 1/1995 | Halin |
| 5,409,184 A | 4/1995 | Udall et al. |
| 5,435,124 A | 7/1995 | Sadil et al. |
| 5,443,229 A | 8/1995 | O'Brien et al. |
| 5,447,282 A | 9/1995 | Durand |
| 5,452,575 A | 9/1995 | Freid |
| 5,467,941 A | 11/1995 | Chee |
| 5,505,423 A | 4/1996 | Kusijanovic |
| 5,524,847 A | 6/1996 | Brodell et al. |
| 5,725,181 A | 3/1998 | Hey |
| 5,746,391 A | 5/1998 | Rodgers et al. |
| 5,755,092 A | 5/1998 | Dessale et al. |
| 5,810,287 A | 9/1998 | O'Boyle et al. |
| 5,873,547 A | 2/1999 | Dunstan |
| 5,918,356 A | 7/1999 | Guerin et al. |
| 5,927,644 A | 7/1999 | Ellis et al. |
| 6,123,293 A | 9/2000 | Breitbach et al. |
| 6,126,110 A | 10/2000 | Seaquist et al. |
| 6,173,919 B1 | 1/2001 | Le Blaye |
| 6,189,313 B1 | 2/2001 | Cass et al. |
| 6,189,830 B1 | 2/2001 | Schnelz et al. |
| 6,209,822 B1 | 4/2001 | Le Blaye |
| 6,247,667 B1 | 6/2001 | Fenny et al. |
| 6,267,327 B1 | 7/2001 | Siefker |
| 6,276,633 B1 | 8/2001 | Balayn et al. |
| 6,330,985 B1 | 12/2001 | Manteiga et al. |
| 6,330,995 B1 | 12/2001 | Mangeiga et al. |
| 6,340,135 B1 | 1/2002 | Barton |
| 6,341,746 B1 | 1/2002 | Pascal et al. |
| 6,347,765 B1 | 2/2002 | Jule |
| 6,364,254 B1 | 4/2002 | May |
| 6,378,804 B1 | 4/2002 | Cambon |
| 6,398,161 B1 | 6/2002 | Jule et al. |
| 6,494,403 B2 | 12/2002 | Jule et al. |
| 6,607,165 B1 | 8/2003 | Manteiga et al. |
| 6,648,271 B2 | 11/2003 | Levert et al. |
| 6,779,755 B1 | 8/2004 | Thomsen |
| 6,843,449 B1 | 1/2005 | Manteiga et al. |
| 6,988,692 B2 | 1/2006 | Pasquer et al. |
| 7,007,890 B2 | 3/2006 | Beutin et al. |
| 7,069,898 B2 | 7/2006 | Matsuda et al. |
| 7,121,504 B2 | 10/2006 | Machado et al. |
| 7,121,512 B2 | 10/2006 | Bonnaud |
| 7,159,819 B2 | 1/2007 | Machado et al. |
| 7,165,743 B2 | 1/2007 | Pasquer et al. |
| 7,296,768 B2 | 11/2007 | Machado et al. |
| 7,409,831 B2 | 8/2008 | Lepretre |
| 7,581,920 B2 | 9/2009 | Lardllier |
| 7,591,136 B2 | 9/2009 | Bernier et al. |
| 7,740,200 B2 | 6/2010 | Diochon et al. |
| 7,757,494 B2 | 7/2010 | Duverneuil et al. |
| 7,770,841 B2 | 8/2010 | Butler et al. |
| 7,837,139 B2 | 11/2010 | Franchet et al. |
| 7,909,302 B2 | 3/2011 | Audart-Noel et al. |
| 7,913,947 B2 | 3/2011 | Haynes et al. |
| 7,938,359 B2 | 5/2011 | Guibert et al. |
| 7,963,480 B2 | 6/2011 | Lafont et al. |
| 7,966,921 B1 | 6/2011 | Alday |
| 8,028,414 B2 | 10/2011 | Gratton |
| 8,038,092 B2 | 10/2011 | Diochon et al. |
| 8,042,342 B2 | 10/2011 | Diochon et al. |
| 8,057,160 B2 | 11/2011 | Bart et al. |
| 8,087,252 B2 | 1/2012 | De Sousa et al. |
| 8,128,023 B2 | 3/2012 | Cazals |
| 8,133,018 B2 | 3/2012 | Dakowski et al. |
| 8,141,817 B2 | 3/2012 | Baillard et al. |
| 8,146,856 B2 | 4/2012 | Combes et al. |
| 8,167,238 B2 | 5/2012 | Gardes et al. |
| 8,215,580 B2 | 7/2012 | Balk |
| 8,246,309 B2 | 8/2012 | Le Hong |
| 8,418,471 B2 | 4/2013 | Baltas |
| 8,474,750 B2 | 7/2013 | Marche et al. |
| 8,480,025 B2 | 7/2013 | Lafont et al. |
| 8,590,832 B2 | 11/2013 | Bolender et al. |
| 8,640,987 B2 | 2/2014 | Journade et al. |
| 8,727,268 B2 | 5/2014 | Combes et al. |
| 8,740,137 B2 | 6/2014 | Vauchel et al. |
| 8,789,355 B2 | 7/2014 | Elegoet |
| 8,800,916 B2 | 8/2014 | Marche |
| 8,827,199 B2 | 9/2014 | Aeberli et al. |
| 8,840,061 B2 | 9/2014 | Caruel et al. |
| 8,936,213 B2 | 1/2015 | Bedoin et al. |
| 9,032,740 B2 | 5/2015 | Journade et al. |
| 9,067,688 B2 | 6/2015 | Bellabal et al. |
| 2001/0028019 A1 | 10/2001 | Cambon |
| 2002/0074453 A1 | 6/2002 | Bacon |
| 2002/0171007 A1 | 11/2002 | Wilksch |
| 2004/0129832 A1 | 7/2004 | Marche |
| 2004/0251378 A1 | 12/2004 | Bagnall |
| 2004/0251380 A1 | 12/2004 | Pasquer et al. |
| 2005/0067528 A1 | 3/2005 | Loewenstein et al. |
| 2005/0081531 A1 | 4/2005 | Stretton et al. |
| 2005/0178888 A1 | 8/2005 | Machado et al. |
| 2005/0194492 A1 | 9/2005 | Marche |
| 2005/0194493 A1 | 9/2005 | Marche |
| 2005/0230532 A1 | 10/2005 | Stretton et al. |
| 2005/0269444 A1 | 12/2005 | Marche |
| 2005/0269445 A1 | 12/2005 | Chevalier et al. |
| 2005/0269446 A1 | 12/2005 | Dron |
| 2006/0000944 A1 | 1/2006 | Dron |
| 2006/0027705 A1 | 2/2006 | Machado et al. |
| 2006/0038060 A1 | 2/2006 | Almeras et al. |
| 2006/0060697 A1 | 3/2006 | Beaufort |
| 2006/0081733 A1 | 4/2006 | Lam et al. |
| 2006/0219841 A1 | 10/2006 | Dron et al. |
| 2006/0231679 A1 | 10/2006 | Chamberlain |
| 2007/0069068 A1 | 3/2007 | Lafont et al. |
| 2007/0108341 A1 | 5/2007 | Diochon et al. |
| 2007/0138337 A1 | 6/2007 | Audart-Noel et al. |
| 2007/0138338 A1 | 6/2007 | Luo et al. |
| 2007/0205324 A1 | 9/2007 | Diochon et al. |
| 2008/0006738 A1 | 1/2008 | Childress et al. |
| 2008/0067286 A1 | 3/2008 | Cousin et al. |
| 2008/0156930 A1 | 7/2008 | Audart-Noel et al. |
| 2008/0169377 A1 | 7/2008 | Levert |
| 2008/0169378 A1 | 7/2008 | Beaufort et al. |
| 2008/0191088 A1 | 8/2008 | Diochon et al. |
| 2008/0197233 A1 | 8/2008 | Combes et al. |
| 2008/0197262 A1 | 8/2008 | Combes et al. |
| 2008/0210811 A1 | 9/2008 | Diochon et al. |
| 2008/0217467 A1 | 9/2008 | Lafont |
| 2008/0217502 A1 | 9/2008 | Lafont |
| 2008/0223983 A1 | 9/2008 | Lafont et al. |
| 2008/0224018 A1 | 9/2008 | Lafont et al. |
| 2008/0232924 A1 | 9/2008 | Levert |
| 2008/0237394 A1 | 10/2008 | Combes et al. |
| 2008/0245926 A1 | 10/2008 | Journade et al. |
| 2008/0251634 A1 | 10/2008 | Bernardi et al. |
| 2008/0296430 A1 | 12/2008 | Combes et al. |

(56) References Cited

U.S. PATENT DOCUMENTS

| | | |
|---|---|---|
| 2008/0315033 A1 | 12/2008 | Diochon et al. |
| 2008/0315064 A1 | 12/2008 | Dron et al. |
| 2009/0031992 A1 | 2/2009 | Lysinger et al. |
| 2009/0032639 A1 | 2/2009 | Dantin et al. |
| 2009/0084893 A1 | 4/2009 | Balk |
| 2009/0090811 A1 | 4/2009 | Llamas et al. |
| 2009/0108127 A1 | 4/2009 | Cazals |
| 2009/0127405 A1 | 5/2009 | Hahn et al. |
| 2009/0139243 A1 | 6/2009 | Winter |
| 2009/0184197 A1 | 7/2009 | Cloft |
| 2009/0212155 A1 | 8/2009 | Huggins et al. |
| 2009/0218441 A1 | 9/2009 | Marche |
| 2009/0230251 A1 | 9/2009 | Bonnaud et al. |
| 2009/0266932 A1 | 10/2009 | Roche et al. |
| 2009/0266933 A1 | 10/2009 | Foster |
| 2009/0283631 A1 | 11/2009 | Roche |
| 2009/0294580 A1 | 12/2009 | Sammito et al. |
| 2010/0051744 A1 | 3/2010 | Bonnaud et al. |
| 2010/0108802 A1 | 5/2010 | Marche et al. |
| 2010/0127117 A1 | 5/2010 | Combes et al. |
| 2010/0133376 A1* | 6/2010 | Foyer .................... B64D 27/26 244/54 |
| 2010/0147997 A1 | 6/2010 | Martinou et al. |
| 2010/0155525 A1 | 6/2010 | Stuart et al. |
| 2010/0155566 A1 | 6/2010 | Linz |
| 2010/0163671 A1 | 7/2010 | Svensson et al. |
| 2010/0170980 A1 | 7/2010 | Haramburu et al. |
| 2010/0176239 A1 | 7/2010 | Marche |
| 2010/0176250 A1 | 7/2010 | Porte |
| 2010/0181419 A1 | 7/2010 | Haramburu et al. |
| 2010/0193627 A1 | 8/2010 | Lafont |
| 2010/0242428 A1 | 9/2010 | Vauchel et al. |
| 2010/0314491 A1 | 12/2010 | Forbes et al. |
| 2011/0001002 A1 | 1/2011 | Chouard et al. |
| 2011/0002782 A1 | 1/2011 | Boucher et al. |
| 2011/0011972 A1 | 1/2011 | Vache |
| 2011/0030375 A1 | 2/2011 | Bunker |
| 2011/0036942 A1 | 2/2011 | Marche et al. |
| 2011/0036943 A1 | 2/2011 | Marche et al. |
| 2011/0079679 A1 | 4/2011 | Journade et al. |
| 2011/0108662 A1 | 5/2011 | Diochon et al. |
| 2011/0121132 A1 | 5/2011 | Crook et al. |
| 2011/0127371 A1 | 6/2011 | Takeuchi |
| 2011/0155847 A1 | 6/2011 | Journade et al. |
| 2011/0168836 A1 | 7/2011 | Sanz et al. |
| 2011/0192933 A1 | 8/2011 | Guering et al. |
| 2011/0204179 A1 | 8/2011 | Skelly et al. |
| 2011/0248116 A1 | 10/2011 | Diochon et al. |
| 2011/0266389 A1 | 11/2011 | Combes et al. |
| 2011/0284686 A1 | 11/2011 | Caruel et al. |
| 2011/0290935 A1 | 12/2011 | Machado et al. |
| 2011/0290936 A1 | 12/2011 | Machado et al. |
| 2011/0296676 A1 | 12/2011 | Bonnet et al. |
| 2011/0309188 A1 | 12/2011 | Marche |
| 2011/0309189 A1 | 12/2011 | Marche et al. |
| 2011/0315813 A1 | 12/2011 | Rinjonneau et al. |
| 2011/0315814 A1 | 12/2011 | Mulcaire |
| 2012/0001019 A1 | 1/2012 | Morvant et al. |
| 2012/0006936 A1 | 1/2012 | Marche et al. |
| 2012/0012694 A1 | 1/2012 | West |
| 2012/0018575 A1 | 1/2012 | Whiteford et al. |
| 2012/0056033 A1 | 3/2012 | Teulou et al. |
| 2012/0068011 A1 | 3/2012 | Thomas et al. |
| 2012/0070287 A1 | 3/2012 | Lafont et al. |
| 2012/0080554 A1 | 4/2012 | Lafont et al. |
| 2012/0080555 A1 | 4/2012 | Lafont et al. |
| 2012/0085859 A1 | 4/2012 | Barnes et al. |
| 2012/0095663 A1 | 4/2012 | Roy et al. |
| 2012/0104161 A1 | 5/2012 | Shah |
| 2012/0119056 A1 | 5/2012 | Dunleavy et al. |
| 2012/0145824 A1 | 6/2012 | Bensilum et al. |
| 2012/0168558 A1 | 7/2012 | Journade et al. |
| 2013/0101421 A1 | 4/2013 | Delapierre et al. |
| 2014/0061375 A1* | 3/2014 | Sandy .................... B64D 27/26 244/54 |

FOREIGN PATENT DOCUMENTS

| | | |
|---|---|---|
| CN | 102171100 A | 8/2011 |
| CN | 102774502 A | 11/2012 |
| DE | 2045687 C2 | 8/1982 |
| DE | 4217374 A1 | 12/1993 |
| DE | 19939481 A1 | 4/2001 |
| DE | 10020839 A1 | 10/2001 |
| DE | 10216258 A1 | 4/2003 |
| DE | 102004005237 A1 | 8/2005 |
| DE | 102004004980 A1 | 9/2005 |
| DE | 102004031783 A1 | 1/2006 |
| DE | 202006001026 U1 | 4/2006 |
| DE | 102006001189 A1 | 7/2007 |
| DE | 102006045943 A1 | 4/2008 |
| DE | 102006051375 A1 | 4/2008 |
| DE | 102009048201 A1 | 4/2011 |
| DE | 102009053002 A1 | 5/2011 |
| DE | 102010023998 A1 | 12/2011 |
| EP | 38227 A1 | 10/1981 |
| EP | 249553 A1 | 12/1987 |
| EP | 524875 A1 | 1/1993 |
| EP | 582522 A1 | 2/1994 |
| EP | 745531 A1 | 12/1996 |
| EP | 769617 A1 | 4/1997 |
| EP | 934877 A1 | 8/1999 |
| EP | 940337 A1 | 9/1999 |
| EP | 1053936 A1 | 11/2000 |
| EP | 1053937 A1 | 11/2000 |
| EP | 1053938 A1 | 11/2000 |
| EP | 1136355 A1 | 9/2001 |
| EP | 1266826 A1 | 12/2002 |
| EP | 1481895 A1 | 12/2004 |
| EP | 1481896 A1 | 12/2004 |
| EP | 1103463 B1 | 6/2005 |
| EP | 1535837 A1 | 6/2005 |
| EP | 1538080 A1 | 6/2005 |
| EP | 1538081 A1 | 6/2005 |
| EP | 1544106 A1 | 6/2005 |
| EP | 1553019 A1 | 7/2005 |
| EP | 1794051 A1 | 6/2007 |
| EP | 1902951 A1 | 3/2008 |
| EP | 1928736 A1 | 6/2008 |
| EP | 1928740 A1 | 6/2008 |
| EP | 2062819 A1 | 5/2009 |
| EP | 2074317 A1 | 7/2009 |
| EP | 2082961 A1 | 7/2009 |
| EP | 2133270 A2 | 12/2009 |
| EP | 2221249 A2 | 8/2010 |
| FR | 2654701 A1 | 5/1991 |
| FR | 2698848 A1 | 6/1994 |
| FR | 2735444 A3 | 12/1996 |
| FR | 2781382 A1 | 1/2000 |
| FR | 2791319 A1 | 9/2000 |
| FR | 2813103 A1 | 2/2002 |
| FR | 2830515 A1 | 4/2003 |
| FR | 2835892 A1 | 8/2003 |
| FR | 2858360 A1 | 2/2005 |
| FR | 2860041 A1 | 3/2005 |
| FR | 2865450 A1 | 7/2005 |
| FR | 2869018 A1 | 10/2005 |
| FR | 2873987 A1 | 2/2006 |
| FR | 2875866 A1 | 3/2006 |
| FR | 2879684 A1 | 6/2006 |
| FR | 2880098 A1 | 6/2006 |
| FR | 2881190 A1 | 7/2006 |
| FR | 2883939 A1 | 10/2006 |
| FR | 2884868 A1 | 10/2006 |
| FR | 2885878 A1 | 11/2006 |
| FR | 2886714 A1 | 12/2006 |
| FR | 2887522 A1 | 12/2006 |
| FR | 2887850 A1 | 1/2007 |
| FR | 2891252 A1 | 3/2007 |
| FR | 2891253 A1 | 3/2007 |
| FR | 2891254 A1 | 3/2007 |
| FR | 2891255 A1 | 3/2007 |
| FR | 2891583 A1 | 4/2007 |
| FR | 2891896 A1 | 4/2007 |
| FR | 2897639 A1 | 8/2007 |

(56) References Cited

FOREIGN PATENT DOCUMENTS

| | | |
|---|---|---|
| FR | 2903454 A1 | 1/2008 |
| FR | 2905985 A1 | 3/2008 |
| FR | 2906568 A1 | 4/2008 |
| FR | 2907840 A1 | 5/2008 |
| FR | 2908828 A1 | 5/2008 |
| FR | 2909359 A1 | 6/2008 |
| FR | 2909419 A1 | 6/2008 |
| FR | 2909973 A1 | 6/2008 |
| FR | 2911524 A1 | 7/2008 |
| FR | 2911632 A1 | 7/2008 |
| FR | 2911668 A1 | 7/2008 |
| FR | 2913050 A1 | 8/2008 |
| FR | 2915519 A1 | 10/2008 |
| FR | 2915520 A1 | 10/2008 |
| FR | 2920198 A1 | 2/2009 |
| FR | 2921341 A1 | 3/2009 |
| FR | 2922588 A1 | 4/2009 |
| FR | 2923460 A1 | 5/2009 |
| FR | 2925016 A1 | 6/2009 |
| FR | 2926602 A1 | 7/2009 |
| FR | 2927952 A1 | 8/2009 |
| FR | 2929917 A1 | 10/2009 |
| FR | 2930527 A1 | 10/2009 |
| FR | 2933131 A1 | 1/2010 |
| FR | 2933150 A1 | 1/2010 |
| FR | 2934641 A1 | 2/2010 |
| FR | 2938874 A1 | 5/2010 |
| FR | 2942512 A1 | 8/2010 |
| FR | 2943098 A1 | 9/2010 |
| FR | 2943404 A1 | 9/2010 |
| FR | 2943984 A1 | 10/2010 |
| FR | 2944062 A1 | 10/2010 |
| FR | 2944089 A1 | 10/2010 |
| FR | 2945787 A1 | 11/2010 |
| FR | 2946270 A1 | 12/2010 |
| FR | 2946400 A1 | 12/2010 |
| FR | 2949366 A1 | 3/2011 |
| FR | 2949435 A1 | 3/2011 |
| FR | 2949754 A1 | 3/2011 |
| FR | 2950116 A1 | 3/2011 |
| FR | 2950201 A1 | 3/2011 |
| FR | 2950928 A1 | 4/2011 |
| FR | 2952564 A1 | 5/2011 |
| FR | 2952842 A1 | 5/2011 |
| FR | 2954277 A1 | 6/2011 |
| FR | 2954420 A1 | 6/2011 |
| FR | 2954797 A1 | 7/2011 |
| FR | 2956187 A1 | 8/2011 |
| FR | 2956706 A1 | 8/2011 |
| FR | 2958263 A1 | 10/2011 |
| FR | 2958264 A1 | 10/2011 |
| FR | 2958265 A1 | 10/2011 |
| FR | 2958266 A1 | 10/2011 |
| FR | 2958974 A1 | 10/2011 |
| FR | 2959527 A1 | 11/2011 |
| FR | 2959782 A1 | 11/2011 |
| FR | 2961257 A1 | 12/2011 |
| FR | 2961566 A1 | 12/2011 |
| FR | 2962156 A1 | 1/2012 |
| FR | 2962975 A1 | 1/2012 |
| FR | 2963608 A1 | 2/2012 |
| FR | 2964947 A1 | 3/2012 |
| FR | 2965010 A1 | 3/2012 |
| FR | 2965547 A1 | 4/2012 |
| FR | 2966803 A1 | 5/2012 |
| GB | 2 013 786 A | 8/1979 |
| GB | 2117054 A | 10/1983 |
| GB | 2202279 A | 9/1988 |
| GB | 2220990 A | 1/1990 |
| GB | 2360749 A | 10/2001 |
| GB | 2375513 A | 11/2002 |
| GB | 2428414 A | 1/2007 |
| JP | S57-190108 U | 12/1982 |
| JP | 61215198 A | 9/1986 |
| JP | 63203498 A | 8/1988 |
| JP | 6490897 A | 4/1989 |
| JP | H01-131355 A | 5/1989 |
| JP | 1229799 A | 9/1989 |
| JP | 3169799 A | 7/1991 |
| JP | 3276899 A | 12/1991 |
| JP | 4066395 A | 3/1992 |
| JP | 4221295 A | 8/1992 |
| JP | 7277290 A | 10/1995 |
| JP | H11-082432 A | 3/1999 |
| JP | 2001-146200 A | 5/2001 |
| JP | 2001334997 A | 12/2001 |
| JP | 2003054500 A | 2/2003 |
| JP | 2003286866 A | 10/2003 |
| JP | 2008105670 A | 5/2008 |
| JP | 2009-284661 A | 12/2009 |
| WO | 1996011843 A1 | 4/1996 |
| WO | 2007001371 A2 | 1/2007 |
| WO | 2007036520 A2 | 4/2007 |
| WO | 2007137812 A1 | 12/2007 |
| WO | 2008129042 A1 | 10/2008 |
| WO | 2008135366 A1 | 11/2008 |
| WO | 2008155386 A1 | 12/2008 |
| WO | 2009098044 A1 | 8/2009 |
| WO | 2009112777 A2 | 9/2009 |
| WO | 2009118469 A2 | 10/2009 |
| WO | 2009127789 A1 | 10/2009 |
| WO | 2010112742 A2 | 10/2010 |
| WO | 2011036385 A1 | 3/2011 |
| WO | 2011055062 A1 | 5/2011 |
| WO | 2011107718 A1 | 9/2011 |
| WO | 2011117521 A1 | 9/2011 |
| WO | 2011157931 A1 | 12/2011 |
| WO | 2012085388 A1 | 6/2012 |

OTHER PUBLICATIONS

Unofficial English translation of Office Action issued in connection with corresponding CN Application No. 201380078515.7 dated Jul. 27, 2016.

Extended European Search Report and Opinion issued in connection with corresponding EP Application No. 13889913.3 dated May 17, 2017.

Machine translation and Notification of Reasons for Refusal issued in connection with corresponding JP Application No. 2016-528285 dated May 23, 2017.

* cited by examiner

AIRCRAFT ENGINE PYLON

BACKGROUND

Contemporary aircraft may include pylon structures to support an engine on a wing of the aircraft. Contemporary engine pylons are built from many separate parts including frames, longerons, and skins, which may be assembled together.

BRIEF DESCRIPTION

Embodiments of the innovation relate to an aircraft engine pylon having an upper fitting, an upper panel located below the upper fitting, a shear pin at least partially coupling the upper fitting and the upper panel, and tension fasteners at least partially coupling the upper fitting and the upper panel, wherein the shear pin defines the primary shear force load path for shear forces acting between the upper fitting and the upper panel, and the tension fasteners define the primary tension force load path for tension forces acting between the upper fitting and the upper panel.

DETAILED DESCRIPTION

Figure 1:
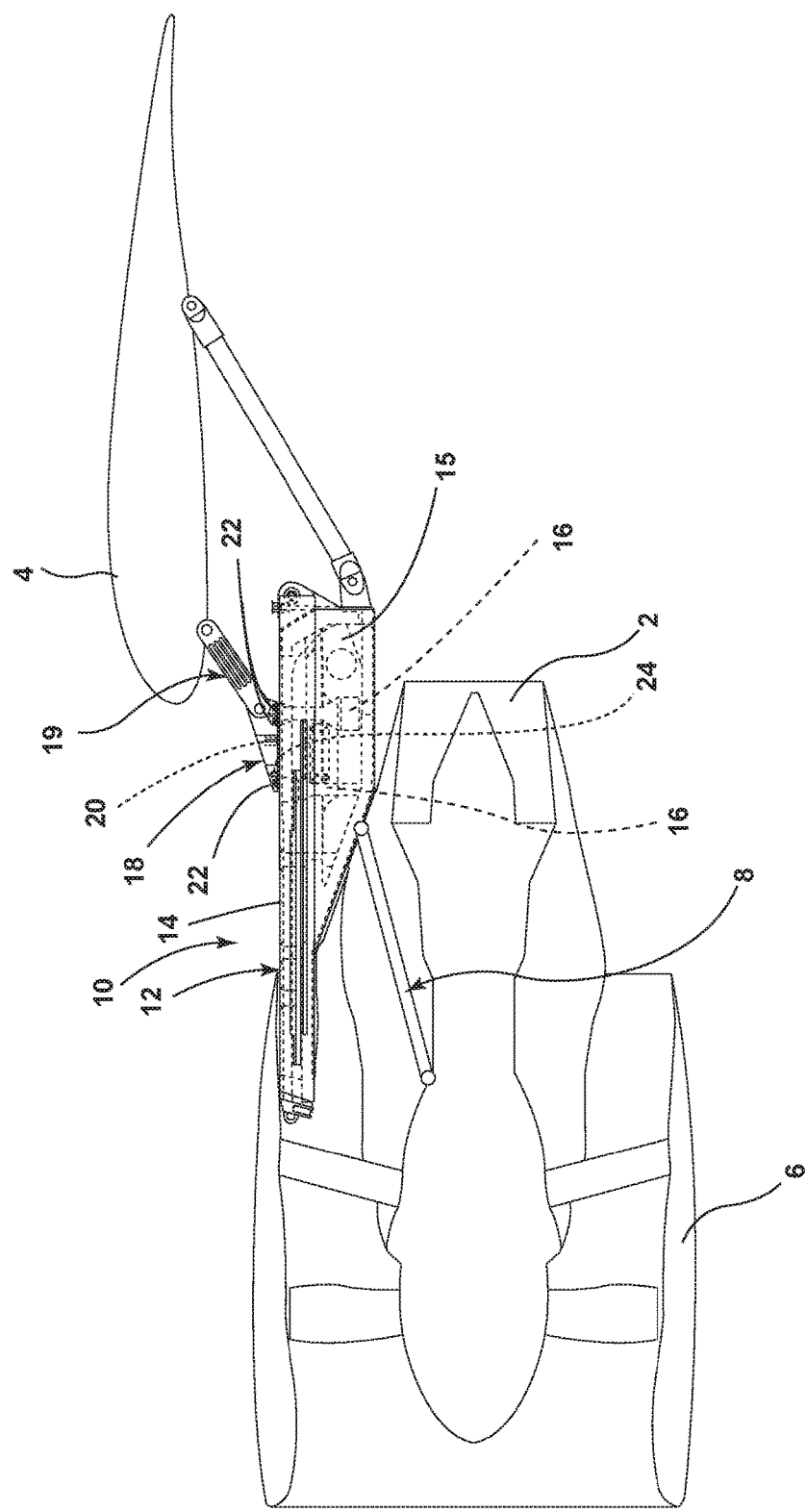
FIG. 1 is a schematic view of a portion of an aircraft including an engine and a pylon with portions shown in phantom.

FIG. 1 illustrates an engine pylon 10 for securing an engine 2 to a wing 4 of an aircraft. A nacelle 6 has been shown partially cut away for clarity as the nacelle 6 surrounds the engine 2. A mounting system 8 may be used to operably couple the engine pylon 10 between the engine 2 and the wing 4. The mounting system 8 may include suspension structures and other fittings. While a commercial aircraft has been illustrated, it is contemplated that the embodiments of the innovation may be used in any type of aircraft. Further, while the engine pylon 10 has been illustrated as coupling the upper portion of the engine 2 to the leading edge and under side of the wing 4 other mounting arrangements and mounting systems may be used.

Figure 2:
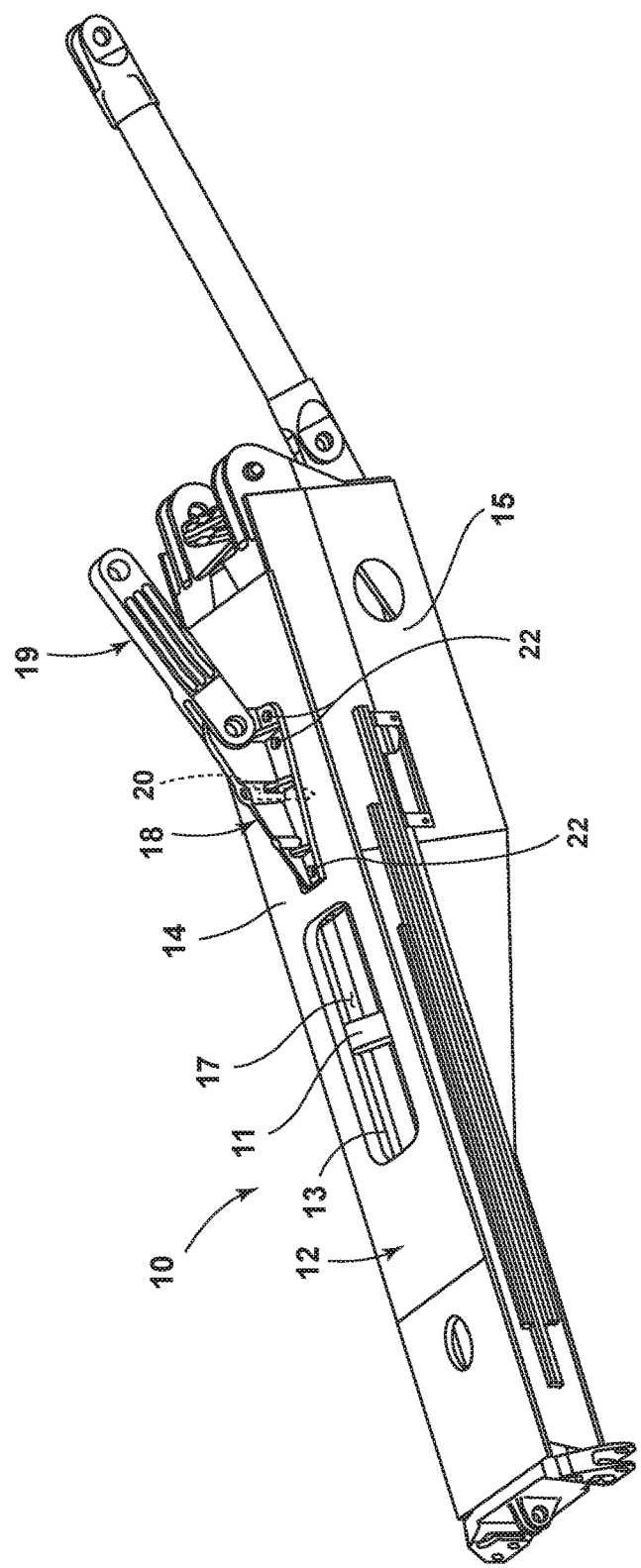
FIG. 2 is a perspective view of a portion of the aircraft engine pylon in accordance with various aspects described herein.

FIG. 2 more clearly illustrates that the engine pylon 10 includes a body 12 having an upper panel 14. The body 12 may be formed in any suitable manner including that it may include frames 11, longerons 13, and skin(s) 15. The upper panel 14 may be formed by the skin(s) 15 and at least one frame 11 may be operably coupled to the upper panel 14. The skin(s) 15 may be provided on the frame 11 to at least partially enclose one or more bays 17 and may be formed by one or more pieces.

Figure 3:
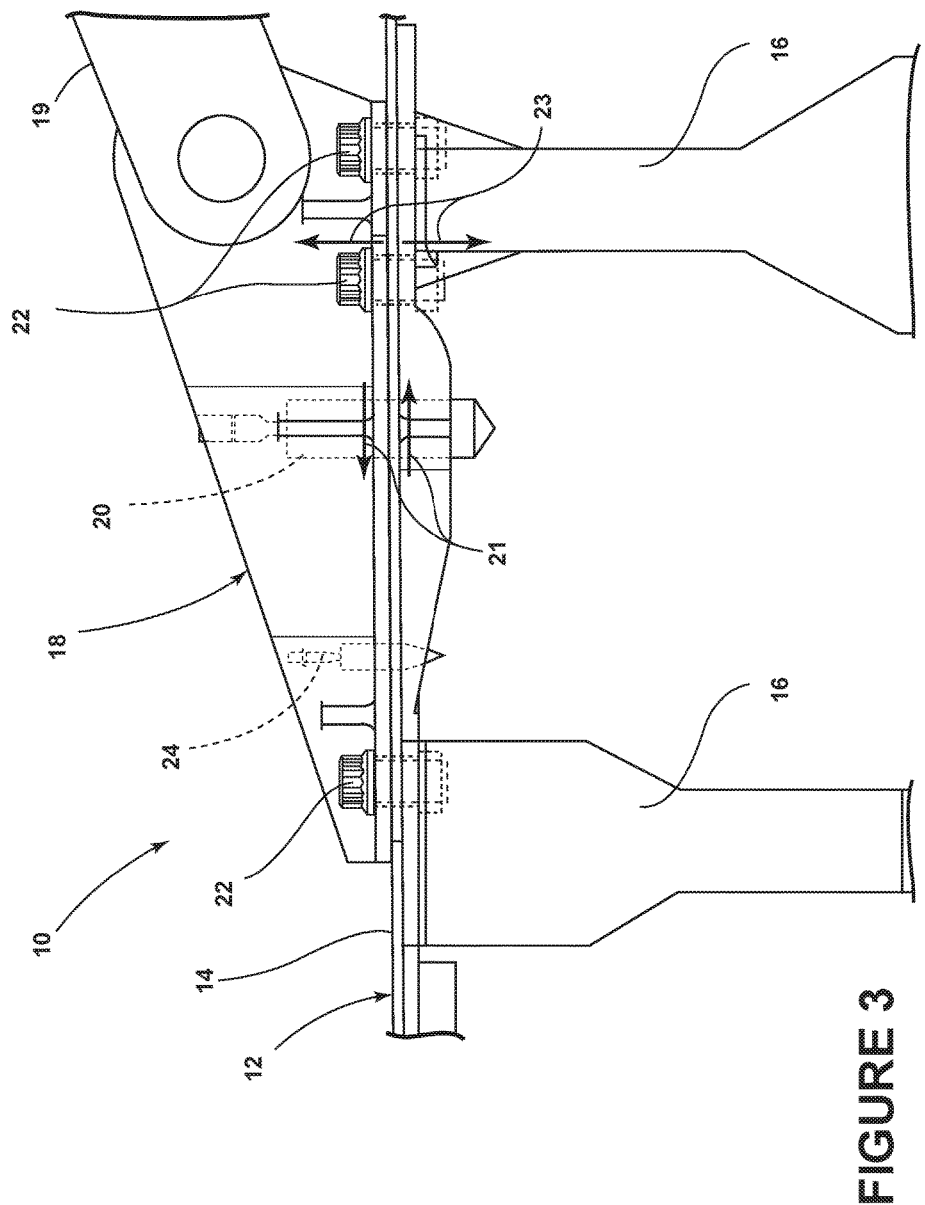
FIG. 3 is a side view of a portion of the aircraft engine pylon in accordance with various aspects described herein.

FIG. 3 illustrates a portion of the engine pylon 10 where it may more clearly be seen that a pair of spaced frames 16 are coupled to the upper panel 14. Further, an upper fitting 18 may be included in the engine pylon 10 and may be located above the upper panel 14. The upper fitting 18 may be operably coupled with an upper link 19, which may form a portion of the mounting system 8 and may be used to operably couple the engine pylon 10 between the engine 2 and the wing 4. The upper fitting 18 may also be operably coupled to the upper panel 14 including that a shear pin 20 may at least partially couple the upper fitting 18 and the upper panel 14. The shear pin 20 may define the primary shear force load path for shear forces acting between the upper fitting 18 and the upper panel 14. Shear forces have been schematically illustrated with arrows 21 and are unaligned forces pushing in opposite directions on the shear pin 20. While the shear pin 20 has been illustrated as being separate from the upper fitting 18, it is contemplated that the shear pin 20 may be integrally formed with the upper fitting 18.

Furthermore, tension fasteners 22 may also at least partially couple the upper fitting 18 and the upper panel 14. Any number of tension fasteners 22 may be included to couple the upper fitting 18 and the upper panel 14. In the engine pylon 10 the tension fasteners have been illustrated as being located around a base of the upper fitting 18. Further, the upper fitting 18 may be operably coupled to an upper surface of the upper panel 14 at a location that overlaps at least a portion of each of the spaced frames 16 that are operably coupled to the upper panel 14, although this need not be the case. In such an instance, the tension fasteners 22 may also operably couple the spaced frames 16. The tension fasteners 22 may define the primary tension force load path for tension forces acting between the upper fitting 18 and upper panel 14. Tension forces or tensile forces have been schematically illustrated with arrows 23 and are forces pulling on the tension fasteners 22.

An anti-rotation pin 24 has also been illustrated as being operably coupled between the upper panel 14 and the upper fitting 18. The anti-rotation pin 24 may prevent rotation between the upper panel 14 and the upper fitting 18 by not allowing the upper panel 14 and the upper fitting 18 to rotate with respect to each other around the shear pin 20.

Figure 4:
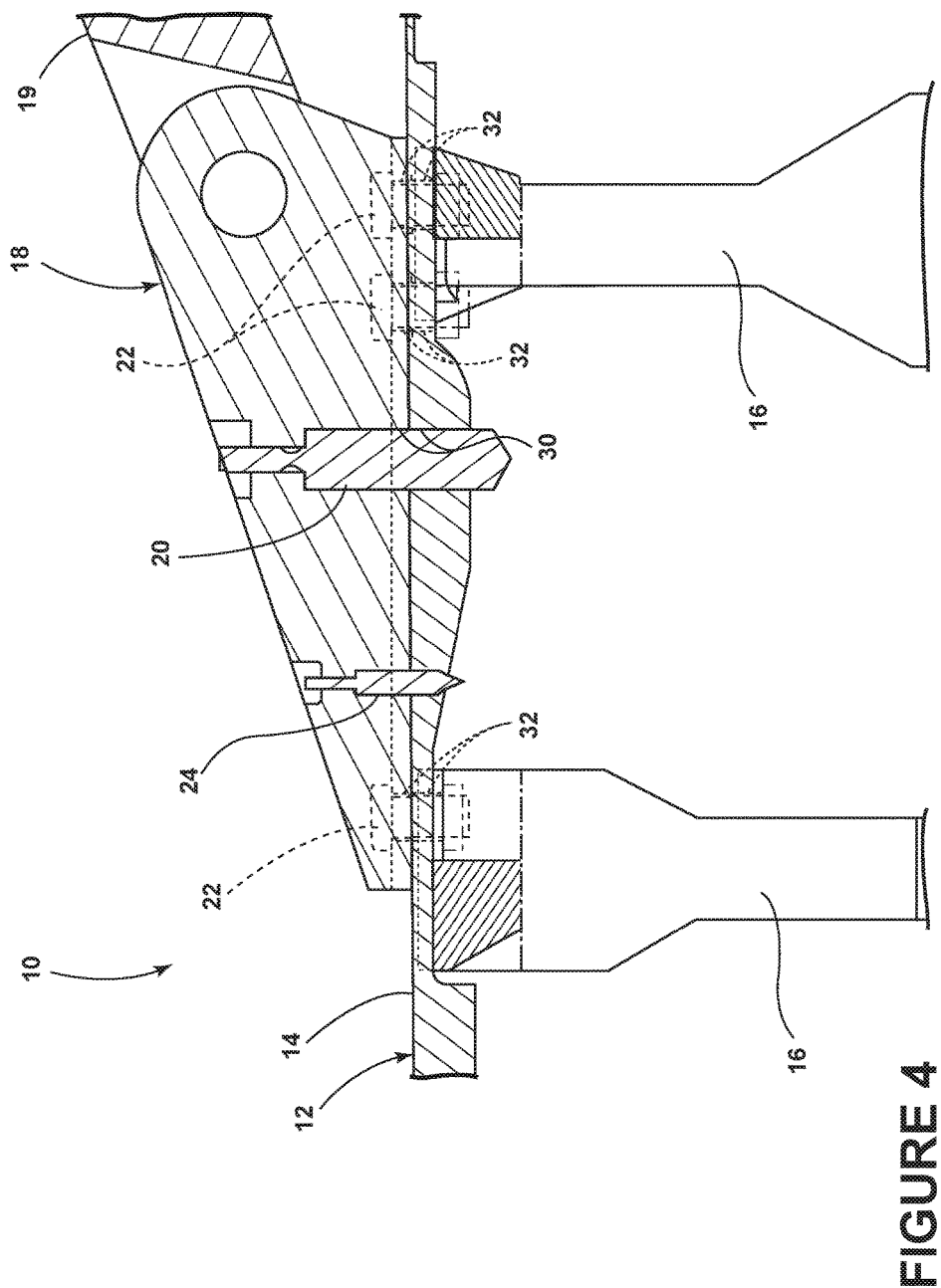
FIG. 4 is a cross-sectional view of a portion of the aircraft engine pylon in accordance with various aspects described herein.

Openings to accommodate the shear pin 20, the tension fasteners 22, and the anti-rotation pin 24 may be formed in each of the upper fitting 18 and the upper panel 14 as illustrated in FIG. 4. More specifically, the upper fitting 18 and the upper panel 14 have been illustrated as having corresponding pin openings 30 for the shear pin 20 to be inserted into. The pin openings 30 may be sized such that the shear pin 20 presses against the pin openings 30 such that when there is a shear load the upper fitting 18 and the upper panel 14 will engage the shear pin 20 for shear load transfer to the shear pin 20. Furthermore, the upper fitting 18 and the upper panel 14 may include corresponding fastener openings 32 for the tension fasteners 22 to extend through. The fastener openings 32 have been illustrated as being wider than portions of the tension fasteners 22 extending there through such that a clearance fit is formed.

Figure 5:
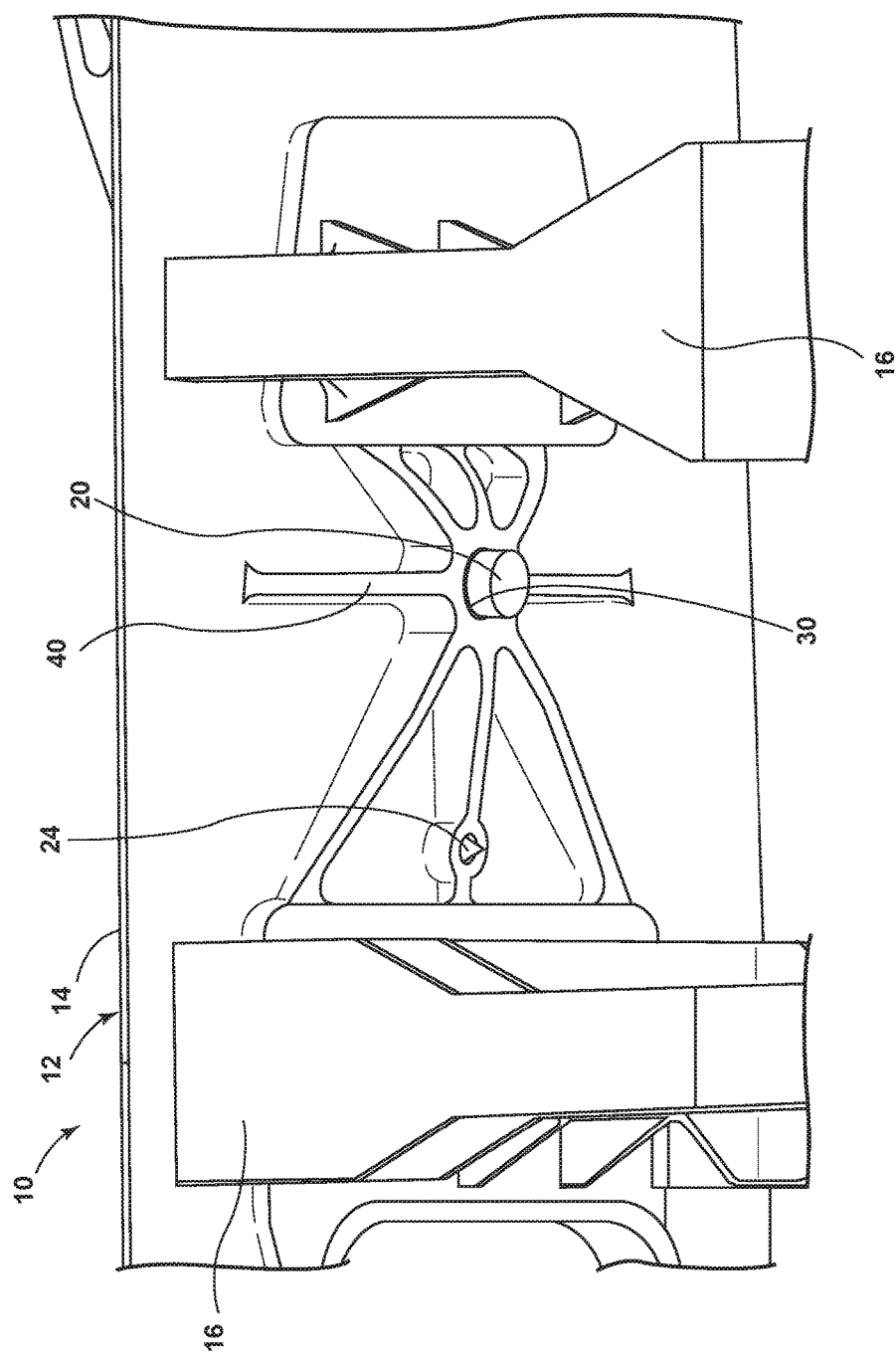
FIG. 5 is a perspective view of a portion of the aircraft engine pylon in accordance with various aspects described herein.

FIG. 5 illustrates a portion of an underside of the upper panel 14, which is located below the upper fitting 18. The upper panel 14 is illustrated as including a reinforcing structure 40 around the shear pin 20. The reinforcing structure 40 may be formed in any suitable manner to provide additional support around the shear pin 20.

During operation, tension load and shear load will be sustained by the tension fasteners 22 and the shear pin 20, respectively, as the shear pin 20 may not transfer tension and the tension fasteners 22 may not transfer shear loads. This is because the clearance between the tension fastener 22 and the fastener openings 32 are bigger than that between the shear pin 20 and the pin opening 30, so when there is a shear load or horizontal displacement trend, the upper fitting 18 and the upper panel 14 will engage the shear pin 20 for shear load transfer but not the tension fasteners 22, as long as the deformation is smaller than the clearance. Alternatively, the shear pin 20 may be designed to transfer some of the tension but remain the primary shear force load path and/or the tension fasteners 22 may be designed to transfer some of the shear forces but remain the primary tension force load path.

Figure 6:
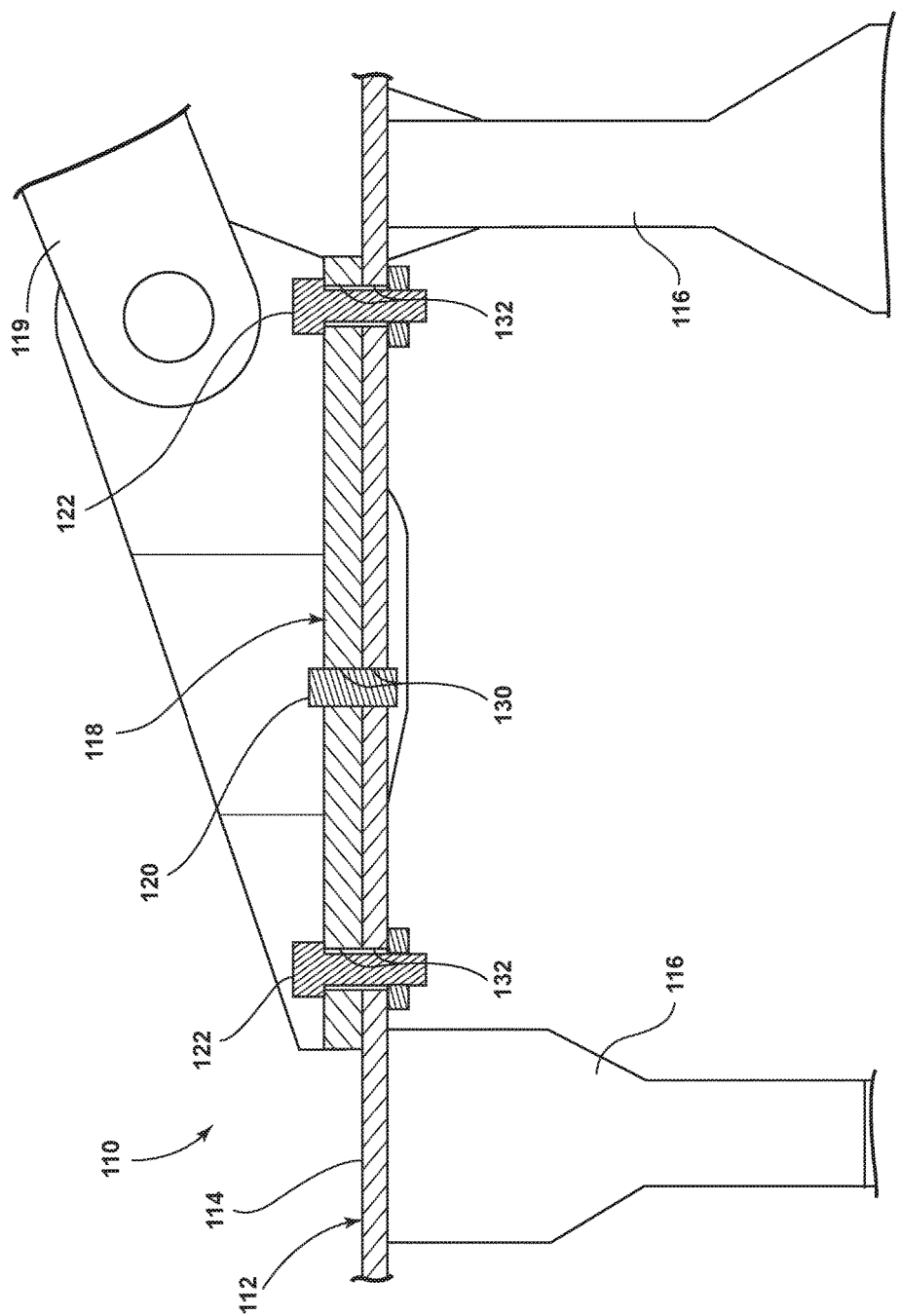
FIG. 6 is a cross-sectional view of an alternative aircraft engine pylon in accordance with various aspects described herein.

FIG. 6 illustrates an alternative engine pylon 110. The engine pylon 110 is similar to the engine pylon 10 previously described and therefore, like parts will be identified with like numerals increased by 100, with it being understood that the description of the like parts of the engine pylon 10 applies to the engine pylon 110, unless otherwise noted. One difference is that the engine pylon 110 does not include an anti-rotation pin. Another difference is that the upper fitting 118 is illustrated as being operably coupled to the upper panel 114 at a location that is between the spaced frames 116. In this manner, the tension fasteners 122 do not operably couple to the spaced frames 116. During operation, the shear pin 120 defines a primary shear force load path for shear forces acting between the upper fitting 118 and the upper panel 114 and the tension fasteners 122 define a primary tension force load path for tension forces acting between the upper fitting 118 and the upper panel 114.

The embodiments described above provide for a variety of benefits including that the embodiments allow for good fatigue performance because the shear pin defines a primary shear force load path for shear forces acting between the upper fitting and the upper panel and the tension fasteners define a primary tension force load path for tension forces acting between the upper fitting and the upper panel. In contemporary engine pylons the fasteners between the upper fitting and the upper panel may sustain both high tension and high shear loads and this greatly reduces the fastener fatigue life.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft engine pylon assembly, comprising:
   an upper fitting configured to mount to a portion of a mounting system;
   an upper panel, forming a portion of a body of a pylon, and wherein the upper panel is located below the upper fitting;
   a shear pin at least partially coupling the upper fitting and the upper panel directly together, wherein the shear pin defines a primary shear force load path for shear forces acting between the upper fitting and the upper panel;
   tension fasteners at least partially coupling the upper fitting and the upper panel directly together, wherein the tension fasteners define a primary tension force load path for tension forces acting between the upper fitting and the upper panel; and
   a pair of spaced frames operably coupled to the upper panel;
   wherein the upper fitting is operably coupled to the upper panel at a location that overlaps at least a portion of each of the pair of spaced frames that are operably coupled to the upper panel.

2. The aircraft engine pylon assembly of claim 1, further comprising an anti-rotation pin operably coupled between the upper panel and the upper fitting for preventing rotation between the upper panel and the upper fitting.

3. The aircraft engine pylon assembly of claim 1 wherein the tension fasteners also operably couple each of the pair of spaced frames.

4. The aircraft engine pylon assembly of claim 1 wherein the upper panel further comprises a reinforcing structure around the shear pin.

5. The aircraft engine pylon assembly of claim 1 wherein the upper panel and the upper fitting include corresponding pin openings for the shear pin to be inserted into and where the pin openings are sized such that the shear pin presses against the pin openings.

6. The aircraft engine pylon assembly of claim 5 wherein the upper panel and the upper fitting include corresponding fastener openings for the tension fasteners to extend through and the fastener openings are wider than portions of the tension fasteners extending there through to form a clearance fit.

7. The engine pylon assembly of claim 1 wherein the upper panel is directly adjacent a length of the upper fitting where the shear pin and the tension fasteners at least partially coupling the upper fitting and the upper panel.

8. An aircraft engine pylon assembly, comprising:
   an engine pylon having a body with an upper panel;
   a pair of spaced frames coupled to the upper panel;
   an upper fitting located above the upper panel and operably coupled to the upper panel at a location that overlaps at least a portion of each of the pair of spaced frames that are operably coupled to the upper panel;
   a shear pin at least partially coupling the upper fitting and the upper panel directly together, wherein the shear pin defines a primary shear force load path for shear forces acting between the upper fitting and the upper panel; and
   tension fasteners at least partially coupling the upper fitting and the upper panel directly together, wherein the tension fasteners define a primary tension force load path for tension forces acting between the upper fitting and the upper panel;
   wherein each of the upper panel and the upper fitting include shear pin openings to accommodate the shear pin and tension fastener openings to accommodate the tension fasteners and wherein the shear pin openings are sized such that the shear pin presses against the pin openings in the upper fitting and the upper panel when there is a shear load and wherein the tension fastener openings are wider than portions of the tension fasteners extending there through.

9. The aircraft engine pylon assembly of claim 8 wherein the upper panel includes at least one skin.

10. The aircraft engine pylon assembly of claim 8, further comprising an anti-rotation pin operably coupled between the upper panel and the upper fitting for preventing rotation between the upper panel and the upper fitting.

11. The aircraft engine pylon assembly of claim 8 wherein the tension fasteners also operably couple the pair of spaced frames, respectively.

12. The aircraft engine pylon assembly of claim 8 wherein the upper panel further comprises a reinforcing structure around the shear pin.

13. The aircraft engine pylon assembly of claim 8 wherein the upper panel is directly adjacent a length of the upper fitting where the shear pin and the tension fasteners at least partially coupling the upper fitting and the upper panel.

\* \* \* \* \*